Jan. 20, 1970          R. L. VAN HUIS          3,490,419
POULTRY AND ANIMAL FEEDER APPARATUS
Filed June 19, 1967          2 Sheets-Sheet 1
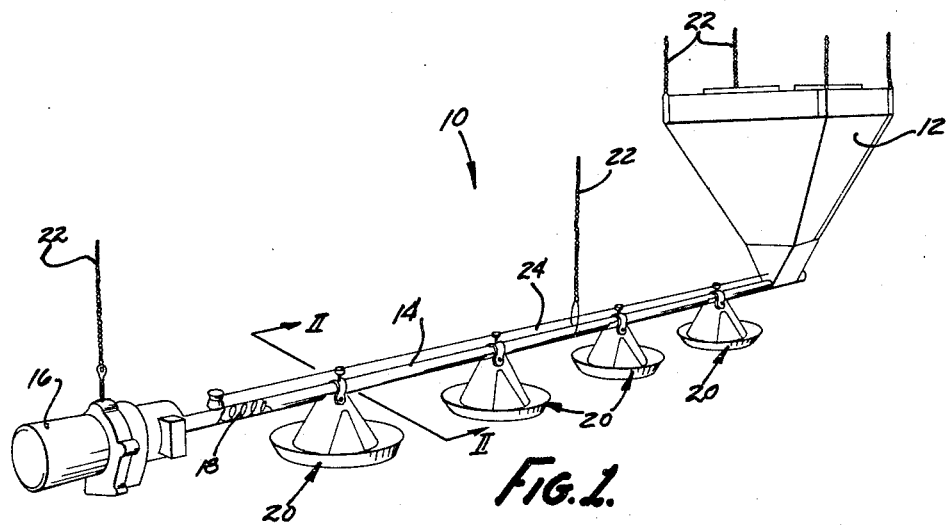
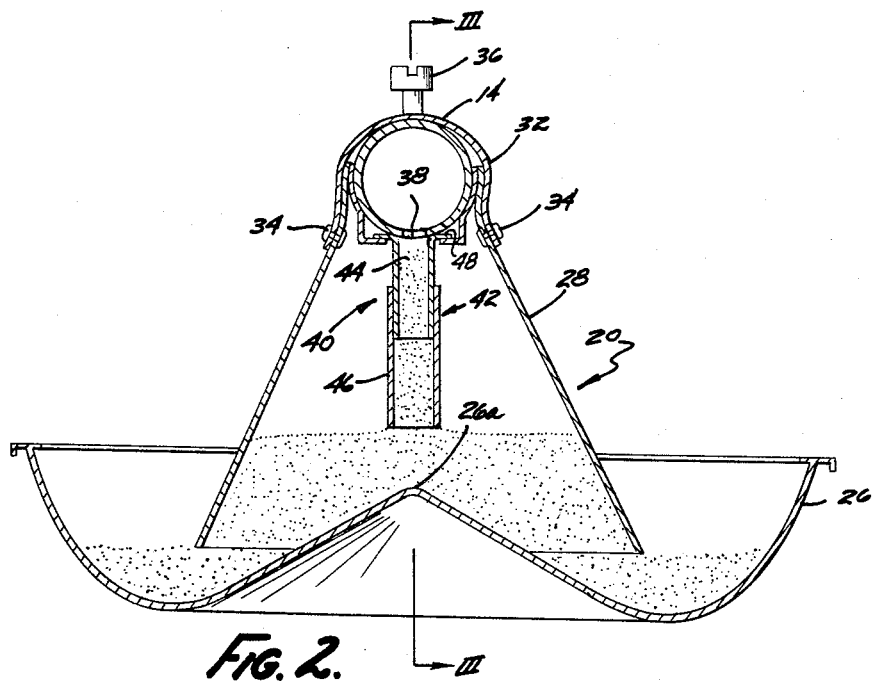
INVENTOR.
ROBERT L. VAN HUIS
BY
ATTORNEYS Jan. 20, 1970  R. L. VAN HUIS  3,490,419
POULTRY AND ANIMAL FEEDER APPARATUS
Filed June 19, 1967  2 Sheets-Sheet 2

INVENTOR.
ROBERT L. VAN HUIS
BY Price, Heneveld
Huizenga & Cooper
ATTORNEYS

United States Patent Office 3,490,419
Patented Jan. 20, 1970

3,490,419
POULTRY AND ANIMAL FEEDER APPARATUS
Robert L. Van Huis, Zeeland, Mich., assignor, by mesne assignments, to U.S. Industries, Inc., New York, N.Y., a corporation of Delaware
Filed June 19, 1967, Ser. No. 647,000
Int. Cl. A01k 39/00, 5/02
U.S. Cl. 119—53                         1 Claim

ABSTRACT OF THE DISCLOSURE

A feed trough communicating with a supply hopper and having an internal conveyor for moving feed therealong. With a desired number of feeder pans attached beneath the feed trough to receive feed therefrom. Each such pan has a substantially enclosed feed-accumulating portion communicating with a feed-dispensing portion, from which the feed is taken by the birds or animals. A feed-limiting drop or chute means is provided, comprising a tubular structure which extends from the trough into the interior of the feeder pan accumulating portion. The interior of this tubular structure communicates with a hole in the bottom of the trough to receive feed therefrom, and the structure transfers such feed into the accumulating portion of the feeder pan. In so doing, the lower extremity of the tubular structure effectively establishes the maximum height to which feed can build up within the accumulating portion. In order for this maximum height to be varied, the tubular structure is preferably lengthwise extendable, as by a slidably telescoping construction.

Background of the invention

This invention relates to systems for the automated feeding of poultry and the like, and more particularly to systems of this type which have a plurality of individual feeder pans, to which feed is supplied from a feed trough having an internal conveyor means and from which feed may be taken by the birds or animals maintained by the system.

Automated feeding systems have been in use for some which include a supply hopper, a feed trough having an internal conveyor means such as an auger or the like, and a plurality of feeder pans attached to the trough and located immediately therebeneath, for receiving feed from the trough, generally through an opening in the bottom of the trough located above each such feeder pan. Feeder pans in systems of this nature generally have a dished or concave lower portion which holds the feed so that it is accessible to the birds or animals being fed, and such feeder pans also often have a generally enclosed upper portion communicating with the feeder trough through an opening therein, for supplying feed to the aforementioned dish-shaped lower portion from the trough.

Because this upper portion communicates directly with the feeder trough, this portion normally accumulates feed within it after the lower portion becomes filled and as feed continues to be moved along the feed trough, until the upper portion actually becomes filled completed with feed. In certain respects this is desirable, since the accumulated feed in the upper portion serves to continuously replenish the feed in the lower portion as the same is eaten by the birds or animals; however, the fact that the upper or accumulating portion has heretofore become completely filled during the operation of the system, has promoted considerable waste and inefficient operation of the system itself, inasmuch as the overabundance of feed within the accumulating portion of the feeder pan is often spilled and wasted, and at times it causes jamming and other problems in the operation of the conveyor means in the feeder trough. Also, it is a problem in carefully controlled feeding operations.

Summary of the invention

The present invention recognizes a basic problem associated with feeding systems of the past and provides a novel means which solves this problem by allowing the height of the feed within the accumulating portion to be regulated and preset, such that this height may be maintained at a predetermined desired level less than the entire volume within the accumulating portion. Further, such means preferably provides for adjustment of the level of feed maintained within the accumulating portion, so that this level may be varied to suit the particular growth habit and condition of the creatures being fed by the system.

Briefly stated, the present invention comprises a feed storage hopper means, a feed trough communicating with such hopper means and extending outwardly therefrom, means for moving feed through the feed trough, and a desired number of feeder pans mounted beneath the feed trough. Each such pan has a feed-dispensing portion from which the poultry may take feed and a feed-accumulating portion for receiving feed from the feed trough, replenishing the feed within the feed-dispensing portion as the same is taken by the poultry, and maintaining a quantity of feed which is unavailable to the poultry; further, each pan has a means located at least partially within its accumulating portion for limiting at a predetermined height the allowable level of feed held in such portion.

Brief description of drawings

FIG. 1 is a perspective view of the overall system of the invention;

FIG. 2 is an enlarged sectional elevation taken through the vertical plane II—II of FIG. 1;

Description of a preferred embodiment

Figure 3:
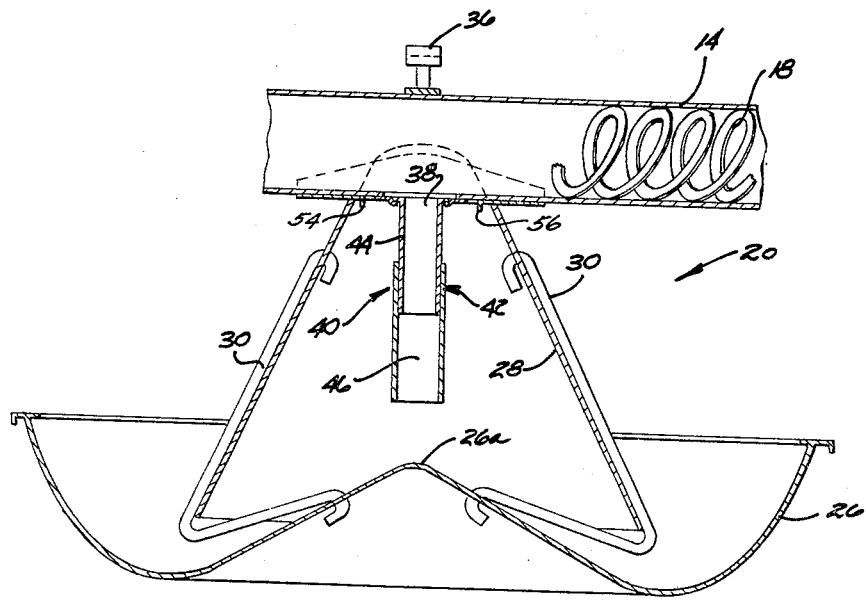
FIG. 3 is a sectional elevation taken through the plane III—III of FIG. 2.

Basically, the overall feeder system 10 seen in FIG. 1 encompasses a feed storage hopper means 12, a feed trough 14 which communicates with the hopper means 12 at the bottom thereof to receive feed from the same and which extends outwardly therefrom, and a power means 16 comprising an electric motor and suitable couplings for driving a conveyor means 18 located within the feed trough 14. Preferably such conveyor means is an open-center auger, as illustrated, although other types of conveyor means may also be used, such as for example a flat conveyor chain, which is used in feeder systems wherein the feed troughs define closed loops leading away from and back to the hopper means. The system 10 also includes a plurality of individual feeder pans 20, each connected to the feed trough 14 to receive feed therefrom, in a manner more fully set forth hereinafter. The entire feeder system 10 is preferably freely suspended from overhead, as by means of chain or cable members 22. An electrically charged anti-roost wire 24 is also preferably included, located immediately above the feed trough 14 and extending therealong. The feed storage hopper means 12 itself is generally of a known type, comprising a walled enclosure which opens at its top to receive fresh supplies of feed and which tapers convergently downward in a generally wedge-shaped configuration. The feed trough 14 is tubular in form when the conveyor means 18 therewithin comprises the aforementioned auger, and the latter extends completely through the length of the trough 14, to draw feed from the bottom of the hopper means 12 along the entire length of the trough.

The feeder pans 20 are seen in more detail in FIGS. 2 and 3, wherein each will be seen to comprise a dished lower extremity 26 providing a feed-dispensing portion, and a generally conically-shaped upper extremity 28 providing a feed accumulating portion. The lower extremity 26 has a conically-shaped upwardly-extending central portion 26a over which the upper extremity 28 is centered, such that feed present within the upper extremity or accumulating portion 28 will slide by gravity down the sloping edges of central portion 26a and outwardly into the dished bottom of the feed dispensing portion 26, where such feed is available to be eaten by feeding birds. Preferably, the lower portion 26 and the upper portion 28 are mutually separate pieces, with the lower such portion 26 being suspended from the upper portion 28, as for example by means of wire connecting elements 30 such as are illustrated in FIG. 3.

The top extremity of the upper or accumulating portion 28 of the feeder pan 20 is shaped to conform to the lower half of the feed trough 14, as shown in FIGS. 2 and 3, and the feed-accumulating portion is secured to the feed trough in this position, preferably by means of a U-shaped strap 32 which extends over the top of the feed trough and is secured to the accumulating portion 28, as by rivets 34 or the like. As illustrated in the figures, the anti-roost wire 24 is preferably supported atop a bolt-shaped insulating element 36 carried by each of the straps 32. The feed trough 14 has an aperture or opening 38 at each location where a feeder pan 20 is to be placed, with the feeder pan being mounted such that the opening in the top of its accumulating portion 28 is generally concentric with the opening 38 in the trough.

Figure 4:
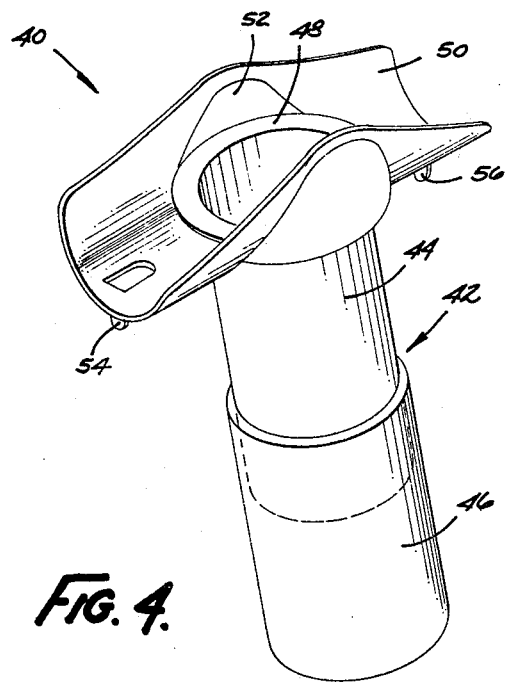
FIG. 4 is an enlarged perspective view of a portion of the structure seen in FIGS. 2 and 3.

Located substantially within the feed-accumulating portion 28 of each feeder pan 20 is a means 40 for limiting at a predetermined height the allowable level of feed which is accumulated or held in the portion 28. Feed-limiting means 40 is illustrated in FIG. 4, and comprises basically a vertically oriented tubular structure 42, preferably having a pair of telescopically interfitted tubular elements 44 and 46 which, while being longitudinally slidable with respect to each other, are nonetheless held in selected relative positions by a friction fit, or by a desired detent arrangement (not specifically shown). The upper such tubular element 44 has an outwardly-directed annular collar or flange 48 at its uppermost extremity which serves to suspend the tubular structure 42 from a transversely-oriented generally semi-cylindrical carrying member 50 having a centrally-located aperture through which the unflanged portion of tubular element 44 is downwardly slidable. The circularly curved cross section of carrying member 50 is such as to generally correspond to the curvature of the auger tube or feed trough 14, such that the carrying member may be fitted against the bottom thereof.

The carrying member 50 is laterally enlarged, as seen at 52 (FIG. 4), in the area defining the aperture through which the tubular element 44 is slidable, to define a flat seat for the flanged portion 48 of such tubular element. The carrying member is also preferably elongated, so that when fitted against the bottom of the auger tube 14 it will prevent rocking movement of the tubular structure 42 with respect to the auger tube; also, the carrying member should extend laterally beyond each side of the top of the accumulating portion 28 when the feeder pan is fitted against the bottom of the auger tube and mounted in place with respect thereto. In this manner the mounting of the feeder pan to the auger tube will serve to hold the feed-limiting means 40 in place between the feeder pan and the auger tube, with the hollow interior of the tubular structure 42 in alignment with the aperture 38 in the feeder trough (FIG. 3). In connection with this mounting arrangement, it will be noted that the carrying member 50 preferably has a pair of tabs 54 and 56 (FIG. 4) struck from its bottom extremity and spaced apart sufficiently to just fit inside the top of the accumulating portion 28, thereby indexing the carrying member with respect thereto and locating the tubular structure 42 centrally of the accumulating portion (FIG. 3).

In operation, with the feeder pans 20 assembled to the feed trough or auger tube 14 in the manner previously described, the auger or other conveying means 18 within the feed trough will initially transfer feed along the length of the feed trough and by so doing will continuously cause feed to drop downwardly through the various openings 38 in the feed trough, directly through the tubular structure 42, through the accumulating portion 28 of the various feeder pans, and into the feed-dispensing portion 26 of the feeder pans.

As the conveyor means continues to run, the level of feed in the feed-dispensing portion 26 of the different feeder pans reaches the level of the bottom of the accumulating portion 28 (FIG. 2), at which time additional feed dropped through the tubular structure 42 no longer falls downwardly into the dispensing portion 26, but instead begins to build up within the accumulating portion 28. This continues until the level of feed within the accumulating portion reaches the height dictated by the lowermost extremity of the tubular structure 42, i.e., the bottom of the tubular element 46. At this point, additional feed dropped through the tubular structure 42 can only build up within the latter until it reaches the height of the feed trough 14. When this occurs, additional feed moved along the length of the feed trough by the conveying means therewithin does not drop through the opening 38, but is merely carried along past the same.

Consequently, the particular length chosen for the tubular structure 42 by relative sliding adjustment of the two tubular elements 44 and 46 effectively determines the amount of feed gathered or held within the accumulating portion 28, which can be practically any desired amount less than the total volume of the accumulating portion. Thus, by means of the system of the present invention, each of the feeder pans 20 can be preset so as to receive a known predetermined amount of feed each time the feeding system is actuated by driving the conveying means 18 thereof. Further, this amount of feed can be varied to suit the particular growth habits and condition of the birds or animals being maintained, as the same change with time. Also, the problems of spillage and operational difficulties experienced previously are overcome.

It is entirely conceivable that upon examining the foregoing disclosure, those skilled in the art may devise embodiments of the concept involved which differ somewhat from the embodiment shown and described herein, or may make various changes in structural details to the present embodiment.

I claim:
1. A feeder pan assembly connected to a trough, said assembly including a feed-accumulating housing wherein a quantity of feed may be maintained and a feed-dispensing pan from which the poultry may take feed, said accumulating housing having a top portion with an opening communicating with an opening in the bottom of the trough and a bottom portion with an opening communicating with said dispensing pan to replenish feed therein; said top portion having a collar portion secured therewith extending a distance along the sides of the trough and secured to the trough by a means extending from said collar over the trough and supporting said housing; means for mounting said pan on said housing, the relative positions thereof determining the level of feed in said pan; and tubular structure means having a saddle shaped carrying member fitted on the underside of the trough and held thereon between said top portion of the housing and the trough, said carrying member including depending tabs engaging the inside of the top portion, said tubular means including a feed tube adjustably extending down from said tubular structure means and thus located at least partially within said accumulating housing for limiting at a predetermined height the allowable level of feed held in such housing.

References Cited

UNITED STATES PATENTS

| | | | |
|---|---|---|---|
| 3,033,163 | 5/1962 | Hostetler et al. | 119—52 |
| 3,085,552 | 4/1963 | Pilch | 119—52 X |
| 3,144,173 | 8/1964 | France et al. | 119—51.11 X |
| 3,230,933 | 1/1966 | Myers et al. | 119—53 |

FOREIGN PATENTS 1,181,482  11/1964  Germany.

HUGH R. CHAMBLEE, Primary Examiner